United States Patent
Chen et al.

(10) Patent No.: US 11,653,326 B2
(45) Date of Patent: *May 16, 2023

(54) METHOD, DEVICE AND READABLE STORAGE MEDIUM FOR PAGING

(71) Applicant: HuiZhou TCL Mobile Communication Co., Ltd., Guangdong (CN)

(72) Inventors: Xiang Chen, Guangdong (CN); Eddy Chiu, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 148 days.

This patent is subject to a terminal disclaimer.

(21) Appl. No.: 17/010,844

(22) Filed: Sep. 3, 2020

(65) Prior Publication Data

US 2020/0404615 A1 Dec. 24, 2020

Related U.S. Application Data

(63) Continuation of application No. 16/650,407, filed as application No. PCT/CN2017/119211 on Dec. 28, 2017, now Pat. No. 10,798,675.

(30) Foreign Application Priority Data

Sep. 26, 2017 (CN) .......................... 201710880903.7

(51) Int. Cl.
*H04W 68/00* (2009.01)
*H04W 56/00* (2009.01)
(Continued)

(52) U.S. Cl.
CPC ....... *H04W 68/005* (2013.01); *H04W 56/001* (2013.01); *H04W 72/046* (2013.01); *H04W 74/0833* (2013.01)

(58) Field of Classification Search
CPC ............. H04W 68/005; H04W 56/001; H04W 72/046; H04W 74/0833; H04B 7/0695; H04L 5/0023; H04L 5/0048; H04L 5/0053

See application file for complete search history.

(56) References Cited

U.S. PATENT DOCUMENTS 10,492,130 B1  11/2019  Zhu et al.
10,582,544 B2   3/2020  Su et al.
(Continued)

FOREIGN PATENT DOCUMENTS

WO  WO 2015/184910  12/2015
WO  WO 2017/121289   7/2017
WO  WO 2019/061910   4/2019

OTHER PUBLICATIONS

Ericsson "Remaining Details on RACH Procedure: Discussion, Decision", Ericsson, 3GPP TSG RAN WG1 NR Ad-Hoc#3, Nagoya, Japan, Sep. 18-21, 2017, R1-1715155, 19 P., Sep. 18, 2017.
(Continued)

*Primary Examiner* — Dinh Nguyen

(57) ABSTRACT

A paging method, a paging device and a readable storage medium thereof are disclosed. The method includes: measuring synchronization signal blocks to obtain signal qualities of the synchronization signal blocks, wherein each synchronization signal block respectively corresponds to at least one of downlink beams, a random access channel resource, and/or a random access preamble; selecting suitable synchronization signal blocks from the synchronization signal blocks based on the signal qualities, wherein the signal qualities of the suitable synchronization signal blocks satisfies a first predetermined condition; and transmitting a RACH resource and/or the random access preamble corresponding to the suitable synchronization signal blocks.

19 Claims, 12 Drawing Sheets

(51) Int. Cl.
*H04W 72/044* (2023.01)
*H04W 74/08* (2009.01)

(56) References Cited

U.S. PATENT DOCUMENTS

| | | | |
|---|---|---|---|
| 2016/0095102 A1 | 3/2016 | Yu et al. | |
| 2016/0100373 A1 | 4/2016 | Chen | |
| 2017/0019932 A1 | 1/2017 | Su et al. | |
| 2017/0289935 A1* | 10/2017 | Yoon | H04L 27/2692 |
| 2017/0290042 A1 | 10/2017 | Islam et al. | |
| 2017/0366992 A1 | 12/2017 | Rune et al. | |
| 2018/0077680 A1 | 3/2018 | Tenny et al. | |
| 2018/0077728 A1* | 3/2018 | Shi | H04W 68/00 |
| 2018/0176065 A1 | 6/2018 | Deng et al. | |
| 2018/0192438 A1 | 7/2018 | John Wilson et al. | |
| 2018/0242268 A1 | 8/2018 | Rune et al. | |
| 2018/0279286 A1 | 9/2018 | Akoum et al. | |
| 2019/0069271 A1* | 2/2019 | Reial | H04W 68/02 |
| 2019/0182682 A1 | 6/2019 | Kirn et al. | |
| 2019/0313345 A1* | 10/2019 | Jiang | H04W 76/27 |
| 2019/0350028 A1* | 11/2019 | Kaasalainen | H04W 76/18 |
| 2020/0229132 A1 | 7/2020 | Chen et al. | |

OTHER PUBLICATIONS

Huawei "Remaining Issues in RACH Procedure: Discussion and Decision", Huawei, HiSilicon, 3GPP TSG RAN WG1 Meeting NR#3, Nagoya, Japan, Sep. 18-21, 2017, R1-1715387, 7 P., Sep. 18, 2017.

InterDigital "NR Paging Based on Paging Indication: Discussion, Decision", InterDigital, Inc., 3GPP TSG RAN WG1 Meeting NR #3, Nagoya, Japan, Sep. 18-21, 2017, R1-1716260, 4 P., Sep. 18, 2017.

Nokia "CSI-RS for Mobility Purposes: Discussion and Decision", Nokia, Alcatel-Lucent Shanghai Bell, 3GPP TSG RAN WG1#89, Hangzhou, P.R. China, May 15-19, 2017, R1-170238, 9 P., May 15, 2017.

Nokia "Mobility Measurements in Idle and Inactive Mode: Discussion and Decision", Nokia, Alcatel-Lucent Shanghai Bell, 3GPP TSG-RAN WG2 Meeting #97, Athens, Greece, Feb. 13-17, 2017, WID/SID: WI Code—Release 14, R2-1700168, 6 P., Feb. 13, 2017.

International Search Report and the Written Opinion dated Jun. 22, 2018 From the International Searching Authority Re. Application No. PCT/CN2017/119211. (3 Pages).

Notice of Allowance dated Jun. 5, 2020 from the US Patent and Trademark Office Re. U.S. Appl. No. 16/650,407. (17 pages).

* cited by examiner

METHOD, DEVICE AND READABLE STORAGE MEDIUM FOR PAGING

RELATED APPLICATIONS

This application is a Continuation of U.S. patent application Ser. No. 16/650,407 filed on Mar. 25, 2020, which is a National Phase of PCT Patent Application No. PCT/CN2017/119211 having International filing date of Dec. 28, 2017, which claims the benefit of priority of Chinese Patent Application No. 201710880903.7, filed on Sep. 26, 2017. The contents of the above applications are all incorporated by reference as if fully set forth herein in their entirety.

FIELD AND BACKGROUND OF THE INVENTION

Embodiments of the present disclosure generally relate to communication technology, and in particular relate to a paging method, a paging device and a readable storage medium thereof.

In LTE/LTE-A, a core network (CN) may notify base stations of a tracking area (TA) on which a user equipment (UE) in radio resource control (RRC) idle (RRC_IDLE) state camps to page the UE so as to notify the UE to establish a connection with a base station of the cell on which the UE currently camps. The UE in RRC_IDLE state monitors physical downlink control channel (PDCCH) during a paging occasion (PO) within a paging frame (PF). If the UE detects downlink control information (DCI) scrambled by the paging-radio network temporary identity (P-RNTI) which is transmitted on the PDCCH during the PO, the UE reads a paging record transmitted on physical downlink shared channel (PDSCH) which is indicated by the DCI so as to check whether its own (the UE's) UE identity (ID) is included in the paging record, and if so, the UE initiates the random access procedure to establish the connection with the base station of the cell currently camping on. The UE in RRC_IDLE state can use discontinuous reception (DRX) technology to reduce the power consumption, in which only one PO is monitored in one DRX cycle.

In new radio (NR), the system faces the challenge of fragile radio links and high penetration loss, as it is envisaged to operate over frequency range up to 100 GHz. In order to solve these problems, beamforming is adopted as an essential technique and beam sweeping is proposed to improve cell coverage. The beam sweeping means that the same signal or channel is carried by at least two beams and transmitted in at least two time units (e.g., subframes, time slots, symbols etc.) within one cycle.

In NR, paging messages (including P-RNTI scrambled DCI and paging records) may be transmitted in a beam sweeping manner. Since the core network or anchor base station has no information of the exact location and the best transmission or reception beam of the UE in RRC_IDLE state or radio resource control inactive (RRC_INACTIVE) state, a straightforward option is to control all the base stations in the TA or notification area (NA) to repeat the transmission of paging messages in all beam directions, which consumes a large number of radio resources and is inefficient.

In the related art, an indication based paging mechanism is proposed. In such method, UEs are divided into a plurality of paging groups including at least one UE, and each paging group is assigned a paging indicator (PI). The base station transmits the PI in the beam sweeping manner during the PO. The UE which has received the assigned PI measures all the synchronization signal blocks (SS-blocks) which can be received to obtain their signal quality, selects one of the SS-blocks with the best signal quality, and responds to the base station utilizing a random access channel (RACH) resource and/or a random access preamble corresponding to the selected SS-block, and then the base station transmits the paging message in the downlink beam(s) corresponding to all the selected SS-block(s). Since the signal quality of the SS-blocks detected by each UE is related to the radio environment where it (each UE) is located, the SS-block selected by different UEs in the same paging group may be quite different, and the base station may need to utilize multiple downlink beams to transmit paging messages, which results in a great signaling overhead, especially in the case of a large number of UEs in a paging group.

SUMMARY OF THE INVENTION

The technical problem to be resolved by the present disclosure is to provide a paging method as well as a paging device and a readable storage medium thereof, which are capable of solving the problem in the related art that UE selects only the downlink beam corresponding to the SS-block with the best signal quality for the subsequent paging message transmission and therefore causes a lot of signaling overhead.

In order to solve the above technical problem, a first aspect of the present disclosure provides a paging method. The method includes: measuring, by a user equipment, synchronization signal blocks to obtain signal qualities of the synchronization signal blocks, wherein each synchronization signal block respectively corresponds to at least one of downlink beams, a random access channel resource, and/or a random access preamble; selecting, by the user equipment, suitable synchronization signal blocks from the synchronization signal blocks based on the signal qualities, wherein the signal qualities of the suitable synchronization signal blocks satisfies a first predetermined condition; and transmitting a random access channel (RACH) resource and/or the random access preamble corresponding to the suitable synchronization signal blocks.

In order to solve the above technical problem, a second aspect of the present disclosure provides a paging device. The device includes a processor and a communication circuit, in which the processor is connected to the communication circuit; and the processor is configured to execute instructions to implement the method of the first or the second aspect of the present disclosure.

In order to solve the above technical problem, a third aspect of the present disclosure provides a readable storage medium. The readable storage medium is stored with instructions, in which the method of the first or the second aspect of the present disclosure is implemented when the instructions are executed.

The present disclosure has the following advantages: the UE firstly selects the suitable SS-blocks from the SS-blocks based on the signal qualities, and then selects the target SS-block from the suitable SS-blocks based on the specified parameters irrelevant to the UE. Since the specified parameters irrelevant to the UE are utilized during the selection, for the UEs which are in the same paging group and located in similar wireless environment (at least parts of the suitable SS-blocks are the same while the SS-blocks with the best signal quality are different), it is possible to select the same target SS-block in the present disclosure while different target SS-blocks in the related art, thereby reducing the number of the downlink beams for transmitting the paging message.

DESCRIPTION OF SPECIFIC EMBODIMENTS OF THE INVENTION

The technical schemes in the embodiments of the present disclosure will now be described in conjunction with the accompanying drawings in the embodiments of the present disclosure, and it will be apparent that the described embodiments are merely part of the embodiments of the disclosure, and are not all embodiments. All other embodiments obtained based on the embodiments in the present disclosure by those of ordinary skill in the art without making creative work are within the scope of the present disclosure. Among the following embodiments, the non-conflicting ones may be combined with each other.

Figure 1:
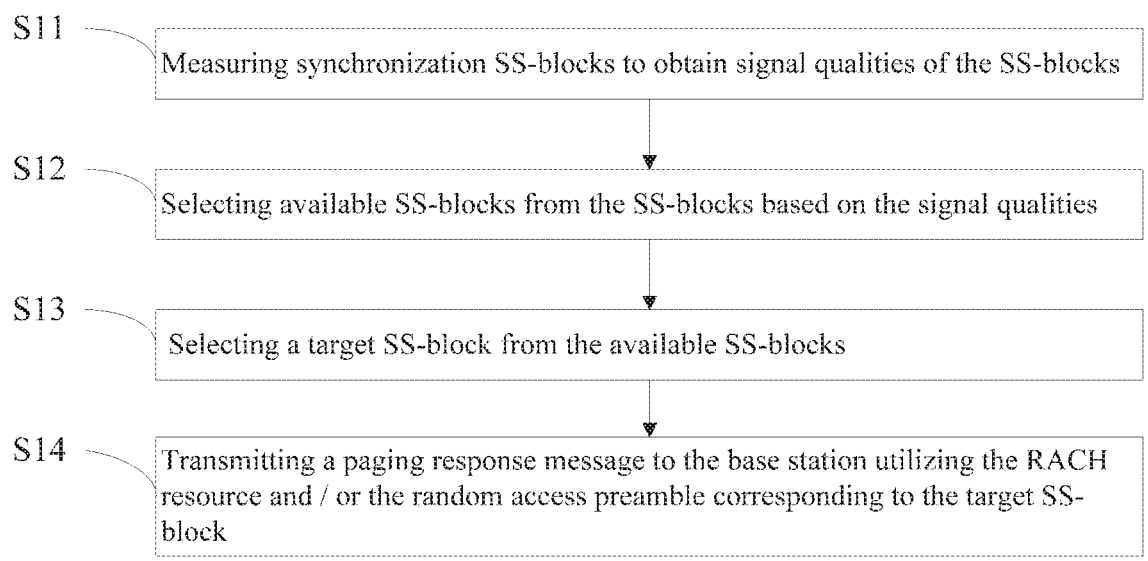
FIG. 1 is a flow chart of a first embodiment of a paging method of the present disclosure.

Referring to FIG. 1, a flow chart of a first embodiment of a paging method of the present disclosure is depicted. An execution main body of the first embodiment of the paging method of the present disclosure is a user equipment (UE). The UE may be fixed or mobile, and may be a cellular phone, a personal digital assistant (PDA), a wireless modem, a tablet computer, a laptop computer, a cordless phone, etc. The method may include the following blocks.

At S11: measuring synchronization signal blocks (SS-blocks) to obtain signal qualities of the SS-blocks.

Each SS-block may include a primary synchronization signal (PSS), a secondary synchronization signal (SSS), and a physical broadcast channel (PBCH). Each SS-block may respectively correspond to at least one downlink beam as well as a random access channel (RACH) resource and/or a random access preamble. Specifically, each SS-block may be transmitted on its corresponding downlink beam and associated with its corresponding RACH resource and/or preamble. Different SS-blocks correspond to different RACH resources and/or random access preambles, and the downlink beams corresponding to different SS-blocks may be in the same direction or in different directions.

The signal qualities of the SS-blocks may be related to the UEs. That is, for the same SS-block, signal qualities of the same SS-block measured by different UEs may be different.

In this embodiment, the UE is in RRC_IDLE or RRC_INACTIVE state, and the SS-blocks may refer to all the SS-blocks which can be received by the UE.

At S12: selecting suitable SS-blocks from the SS-blocks based on the signal qualities.

The signal qualities of the suitable SS-blocks may satisfy a first predetermined condition. The first predetermined condition may include a condition that the signal quality of each suitable SS-block is greater than a predetermined threshold and/or the suitable SS-block belongs to a shortlist of the first n SS-blocks arranged in orders with respect to their signal qualities, such as in an order from the best quality to the worst quality, in which n is the predetermined maximum number of the suitable SS-blocks. The first predetermined condition may be stored locally, or may be transmitted from a base station in advance.

At S13: selecting a target SS-block from the suitable SS-blocks.

Each SS-block may have a specified parameter. A specified parameter of the target SS-block may satisfy a second predetermined condition, and the specified parameter of each SS-block and the second predetermined condition may be irrelevant to the UE. That is, for different UEs, the second predetermined condition and the specified parameter of each SS-block received by different UEs may be the same. The second predetermined condition may be stored locally, or may be transmitted from the base station in advance.

The specified parameter of each SS-block may be a parameter defined by a core network or base station for each suitable SS-block, for example, at least one of a priority, index, etc. The index of each SS-block may be utilized to distinguish different SS-blocks from each other, and the indices of the SS-blocks corresponding to adjacent beams may be consecutive. All the SS-blocks in a cell may be divided into at least two groups, the SS-blocks in the same group are assigned with a same priority, and the SS-blocks in different groups are assigned with different priorities.

The execution of part or all of S11-S13 may be periodic, or be non-periodic, for instance, be triggered upon receiving a paging indicator (PI).

At S14: transmitting a RACH resource and/or the random access preamble corresponding to the target SS-block.

The paging response message may be configured to instruct the base station to transmit the paging message utilizing the downlink beam corresponding to the target SS-block. The base station may confirm the target SS-block selected by the UE based on the RACH resource and/or the random access preamble which carries the paging response message, and further select the downlink beam corresponding to the target SS-block for the subsequent paging message transmission.

In an indication-based paging process, the base station needs to transmit the PI through a beam sweeping manner and then utilize the downlink beam corresponding to the target SS-block selected by the UE to transmit the paging message. The overhead of two downlink transmissions depends on a grouping mode of paging groups, and there exists a complex trade-off between the overhead of two downlink transmissions and the grouping mode of the paging groups. Assuming that all the UEs are equally assigned to the paging groups, the fewer the UEs there are in each paging group, the fewer the downlink beams are needed to transmit the paging message, and the smaller the overhead of the second downlink transmission is, meanwhile the more the paging groups there are, the greater the length of the PI is, and the greater the overhead of the first downlink transmission is. Oppositely, the more the UEs there are in each paging group, the more the downlink beams are needed to transmit the paging message, and the greater the overhead of the second downlink transmission is, meanwhile the fewer the paging groups there are, the smaller the length of the PI is, and the smaller the overhead of the first downlink transmission is.

Through the implementation of this embodiment, the UE first may select the suitable SS-blocks from the SS-blocks based on the signal qualities, and then select the target SS-block from the suitable SS-blocks based on the specified parameters irrelevant to the UE. Since the specified parameters irrelevant to the UE are utilized during the selection, for the UEs in the same paging group and located in similar wireless environment (at least parts of the suitable SS-blocks are the same, while the SS-blocks with the best signal qualities are different), it is possible to select the same target SS-block in the present disclosure while different target SS-blocks are selected in the related art, thereby reducing the number of the downlink beams for transmitting the paging message, without being affected by the grouping mode of the paging groups.

For instance, all the SS-blocks in a cell may be divided into two groups, wherein one group consists of odd-indexed SS-blocks and the other group consists of even-indexed SS-blocks, and the priorities of the two groups are different from each other. Adjacent UEs may select the same suitable SS-blocks, in which the suitable SS-blocks may include the SS-blocks corresponding to two adjacent beams, and the adjacent beams may correspond to the SS-blocks with consecutive indices. The neighboring UEs may select the same target SS-block based on the priority.

Figure 2:
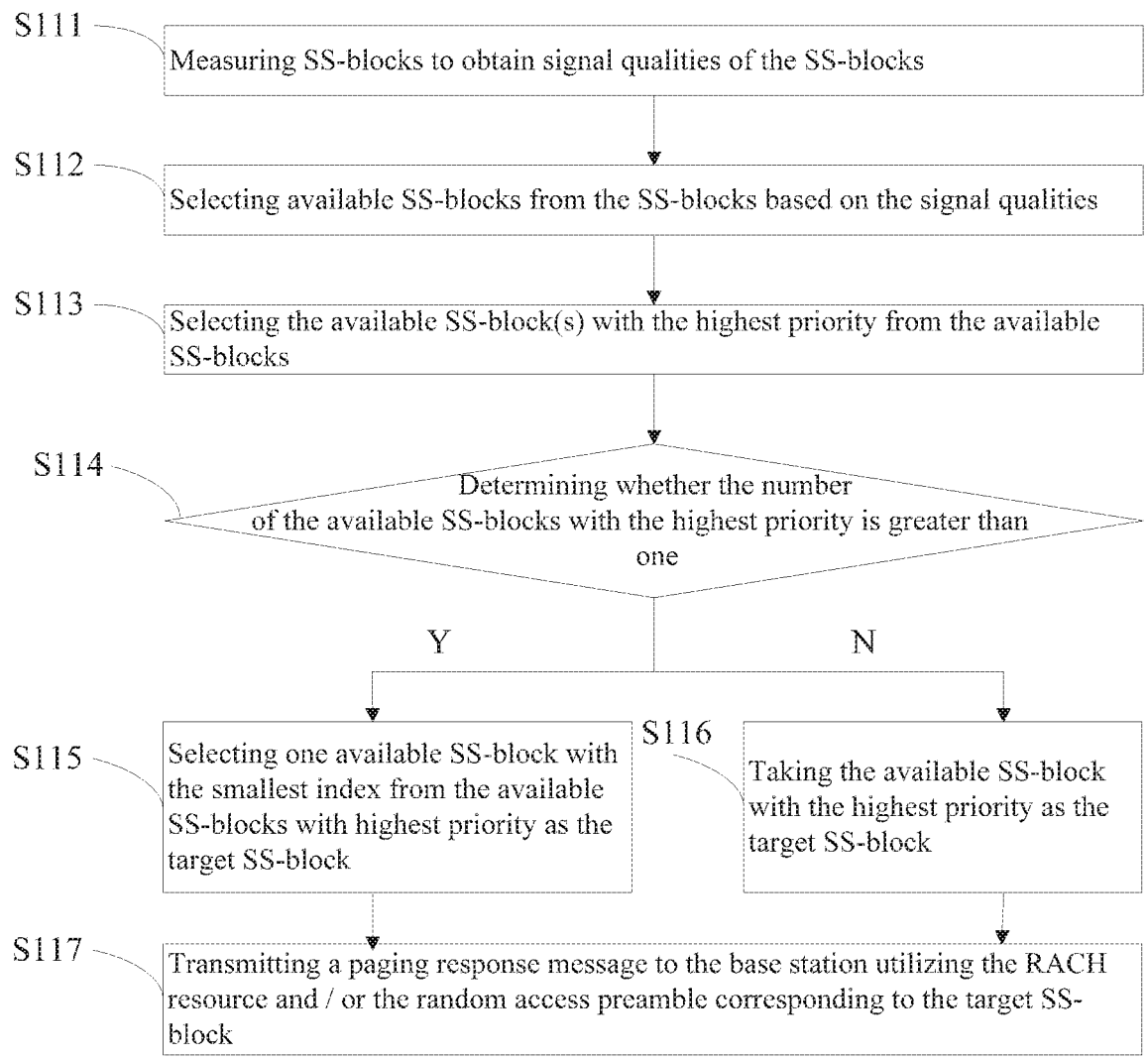
FIG. 2 is a flow chart of a second embodiment of a paging method of the present disclosure.

Referring to FIG. 2, a flow chart of a second embodiment of a paging method of the present disclosure is depicted. This embodiment is based on the first embodiment of the paging method of the present disclosure, where the specified parameter of each SS-block includes a priority and an index, and the second predetermined condition includes a condition that the index of the target SS-block is the smallest when the priority of the target SS-block is the highest. This embodiment is an extension of the first embodiment of the paging method of the present disclosure, hence the same content as the first embodiment of the paging method of the present disclosure is not described again herein. The method may include the following blocks.

At S111: measuring SS-blocks to obtain signal qualities of the SS-blocks.

At S112: selecting suitable SS-blocks from the SS-blocks based on the signal qualities thereof.

At S113: selecting the suitable SS-block(s) with the highest priority from the suitable SS-blocks.

In this embodiment, the highest priority does not refer to the priority of the SS-block(s) with the highest priority among all the SS-blocks in the cell on which the UE currently camps, but refers to the priority of the SS-block(s) with the highest priority among all of the suitable SS-blocks. For instance, if all the SS-blocks in the cell on which the UE currently camps are divided into three groups A, B, and C, the priorities are sequentially reduced based on the order of A, B, and C, and the suitable SS-blocks do not include the SS-blocks in the group A, then the suitable SS-block(s) with the highest priority belong to the group B.

At S114: determining whether the number of the suitable SS-blocks with the highest priority is greater than one.

If the number is greater than one, the process proceeds to S115; otherwise, the process proceeds to S116.

At S115: selecting one suitable SS-block with the smallest index from the suitable SS-blocks with highest priority as the target SS-block.

The process proceeds to S117.

At S116: taking the suitable SS-block with the highest priority as the target SS-block.

At S117: transmitting a paging response message to the base station utilizing the RACH resource and/or the random access preamble corresponding to the target SS-block.

Figure 3:
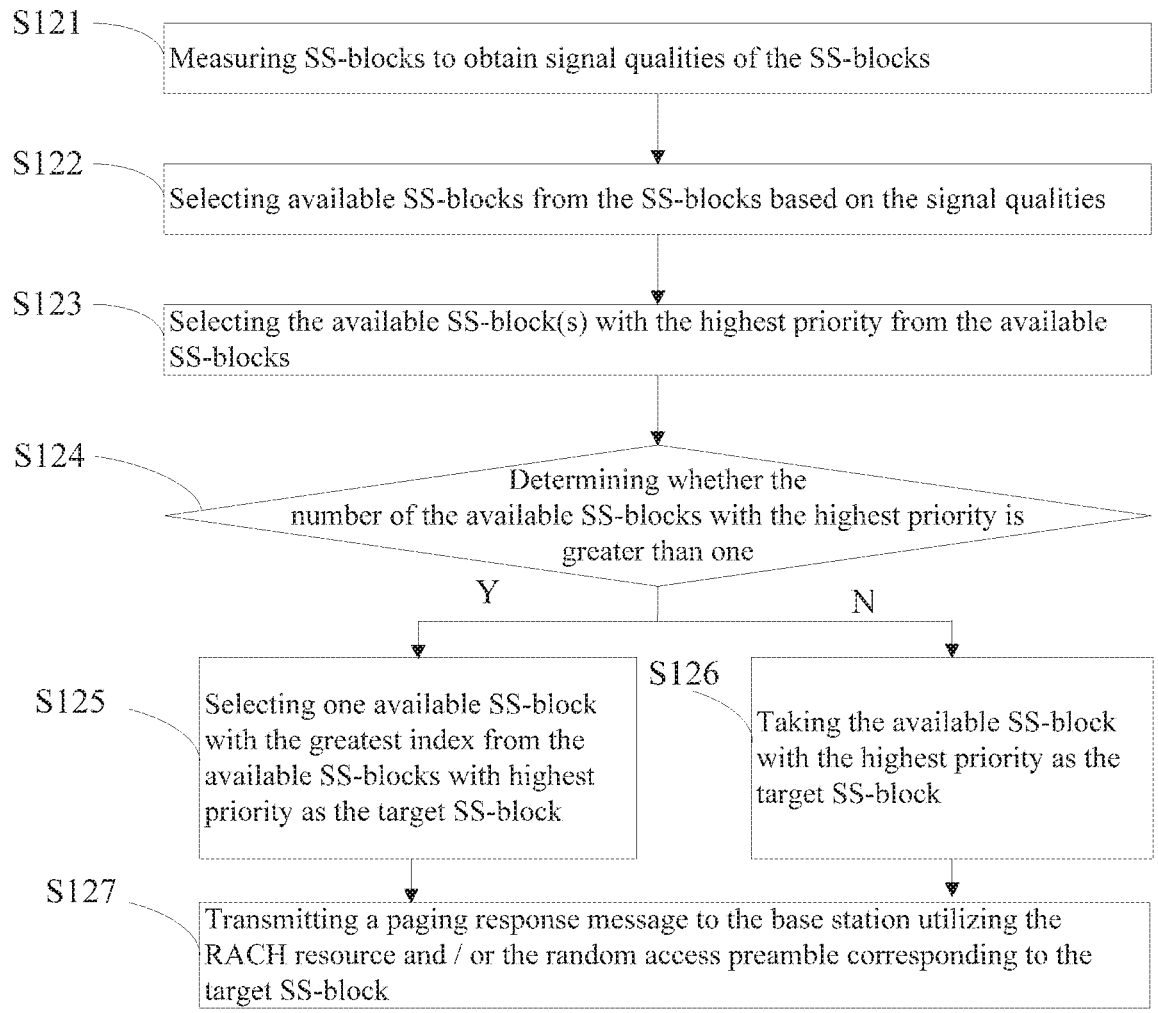
FIG. 3 is a flow chart of a third embodiment of a paging method of the present disclosure.

Referring to FIG. 3, a flow chart of a third embodiment of a paging method of the present disclosure is depicted. This embodiment is based on the first embodiment of the paging method of the present disclosure, where the specified parameter of each SS-block includes a priority and an index, and the second predetermined condition includes a condition that the index of a target SS-block is the greatest while the priority of the target SS-block is the highest. This embodiment is an extension of the first embodiment of the paging method of the present disclosure, hence the same content as the first embodiment of the paging method of the present disclosure is not described again herein. The method may include the following blocks.

At S121: measuring SS-blocks to obtain signal qualities of the SS-blocks.

At S122: selecting suitable SS-blocks from the SS-blocks based on the signal qualities thereof.

At S123: selecting the suitable SS-block(s) with the highest priority from the suitable SS-blocks.

In this embodiment, the highest priority does not refer to the priority of the SS-block(s) with the highest priority among all the SS-blocks in the cell on which the UE currently camps, but refers to the priority of the SS-block(s) with the highest priority among all of the suitable SS-blocks.

At S124: determining whether the number of the suitable SS-blocks with the highest priority is greater than one.

If the number is greater than one, the process proceeds to S125; otherwise, the process proceeds to S126.

At S125: selecting one suitable SS-block with the greatest index from the suitable SS-blocks with highest priority as the target SS-block.

The process proceeds to S127.

At S126: taking the suitable SS-block with the highest priority as the target SS-block.

At S127: transmitting a paging response message to the base station utilizing the RACH resource and/or the random access preamble corresponding to the target SS-block.

Figure 4:
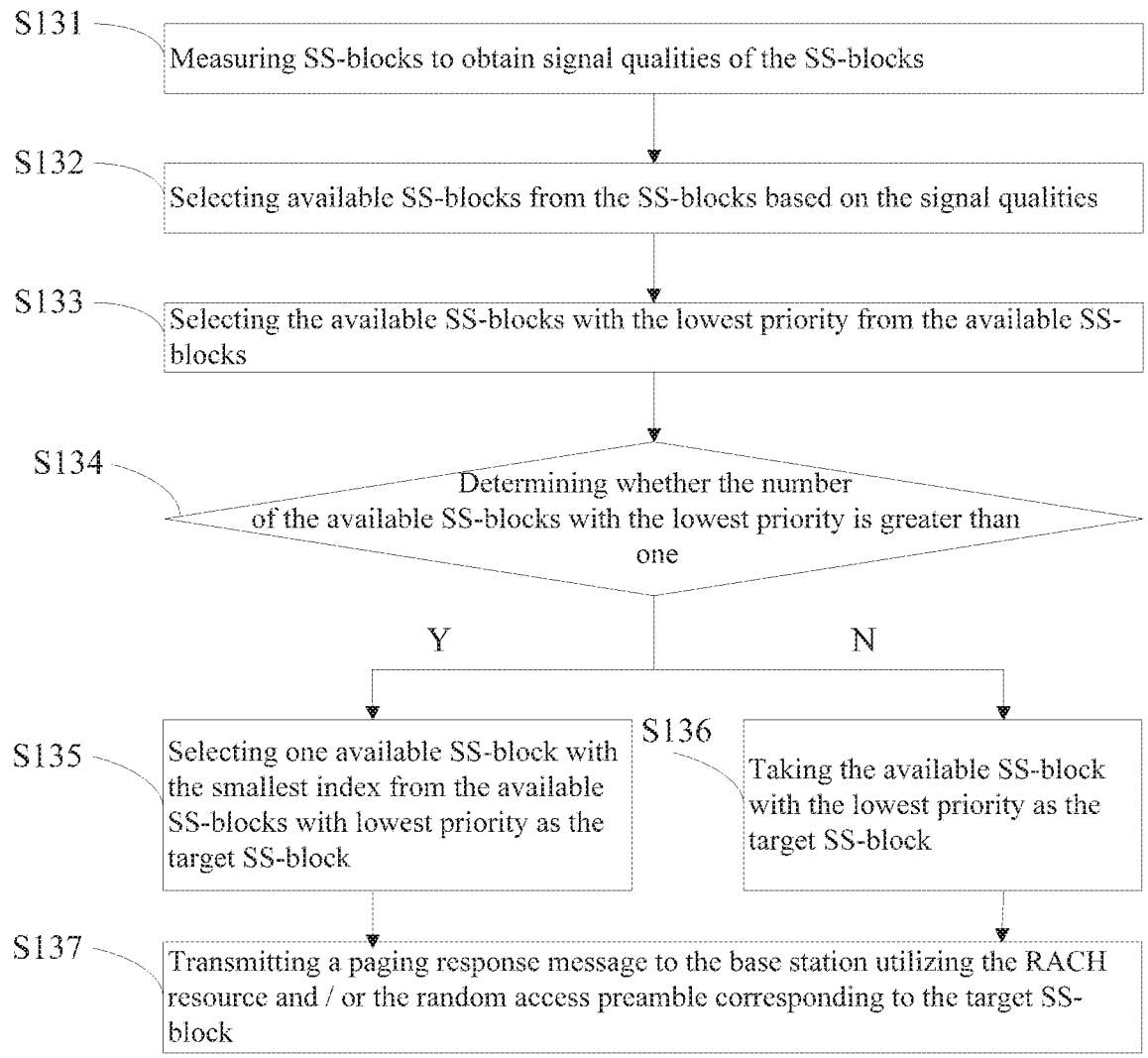
FIG. 4 is a flow chart of a fourth embodiment of a paging method of the present disclosure.

Referring to FIG. 4, a flow chart of a fourth embodiment of a paging method of the present disclosure is depicted. This embodiment is based on the first embodiment of the paging method of the present disclosure, where the specified parameter of each SS-block includes a priority and an index, and the second predetermined condition includes a condition that the index of a target SS-block is the smallest while the priority of the target SS-block is the lowest. This embodiment is an extension of the first embodiment of the paging method of the present disclosure, hence the same content as the first embodiment of the paging method of the present disclosure is not described again herein. The method may include the following blocks.

At S131: measuring SS-blocks to obtain signal qualities of the SS-blocks.

At S132: selecting suitable SS-blocks from the SS-blocks based on the signal qualities.

At S133: selecting the suitable SS-blocks with the lowest priority from the suitable SS-blocks.

In this embodiment, the lowest priority does not refer to the priority of the SS-block(s) with the lowest priority among all the SS-blocks in the cell on which the UE currently camps, but refers to the priority of the SS-block(s) with the lowest priority among all of the suitable SS-blocks.

At S134: determining whether the number of the suitable SS-blocks with the lowest priority is greater than one.

If the number is greater than one, the process proceeds to S135; otherwise, the process proceeds to S136.

At S135: selecting one suitable SS-block with the smallest index from the suitable SS-blocks with lowest priority as the target SS-block.

The process proceeds to S137.

At S136: taking the suitable SS-block with the lowest priority as the target SS-block.

At S137: transmitting a paging response message to the base station utilizing the RACH resource and/or the random access preamble corresponding to the target SS-block.

Figure 5:
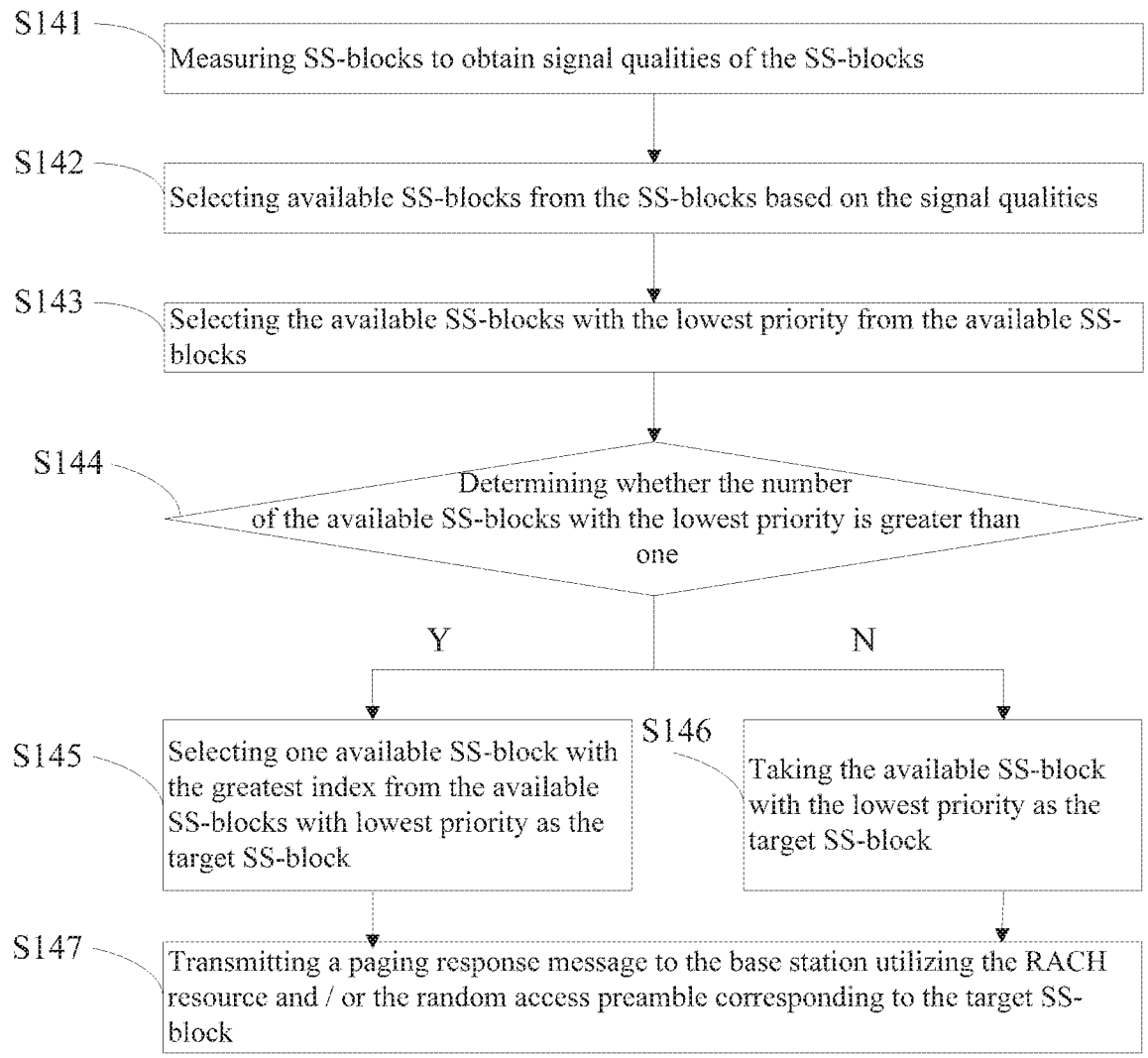
FIG. 5 is a flow chart of a fifth embodiment of a paging method of the present disclosure.

Referring to FIG. 5, a flow chart of a fifth embodiment of a paging method of the present disclosure is depicted. This embodiment is based on the first embodiment of the paging method of the present disclosure, where the specified parameter of each SS-block includes a priority and an index, and the second predetermined condition includes a condition that the index of a target SS-block is the greatest while the priority of the target SS-block is the lowest. This embodiment is an extension of the first embodiment of the paging method of the present disclosure, hence the same content as the first embodiment of the paging method of the present disclosure is not described again herein. The method may include the following blocks.

At S141: measuring SS-blocks to obtain signal qualities of the SS-blocks.

At S142: selecting suitable SS-blocks from the SS-blocks based on the signal qualities.

At S143: selecting the suitable SS-blocks with the lowest priority from the suitable SS-blocks.

In this embodiment, the lowest priority does not refer to the priority of the SS-block(s) with the lowest priority among all the SS-blocks on the cell in which the UE currently camps, but refers to the priority of the SS-block(s) with the lowest priority among all of the suitable SS-blocks.

At S144: determining whether the number of the suitable SS-blocks with the lowest priority is greater than one.

If the number is greater than one, the process proceeds to S145; otherwise, the process proceeds to S146.

At S145: selecting one suitable SS-block with the greatest index from the suitable SS-blocks with lowest priority as the target SS-block.

The process proceeds to S147.

At S146: taking the suitable SS-block with the lowest priority as the target SS-block.

At S147: transmitting a paging response message to the base station utilizing the RACH resource and/or the random access preamble corresponding to the target SS-block.

Figure 6:
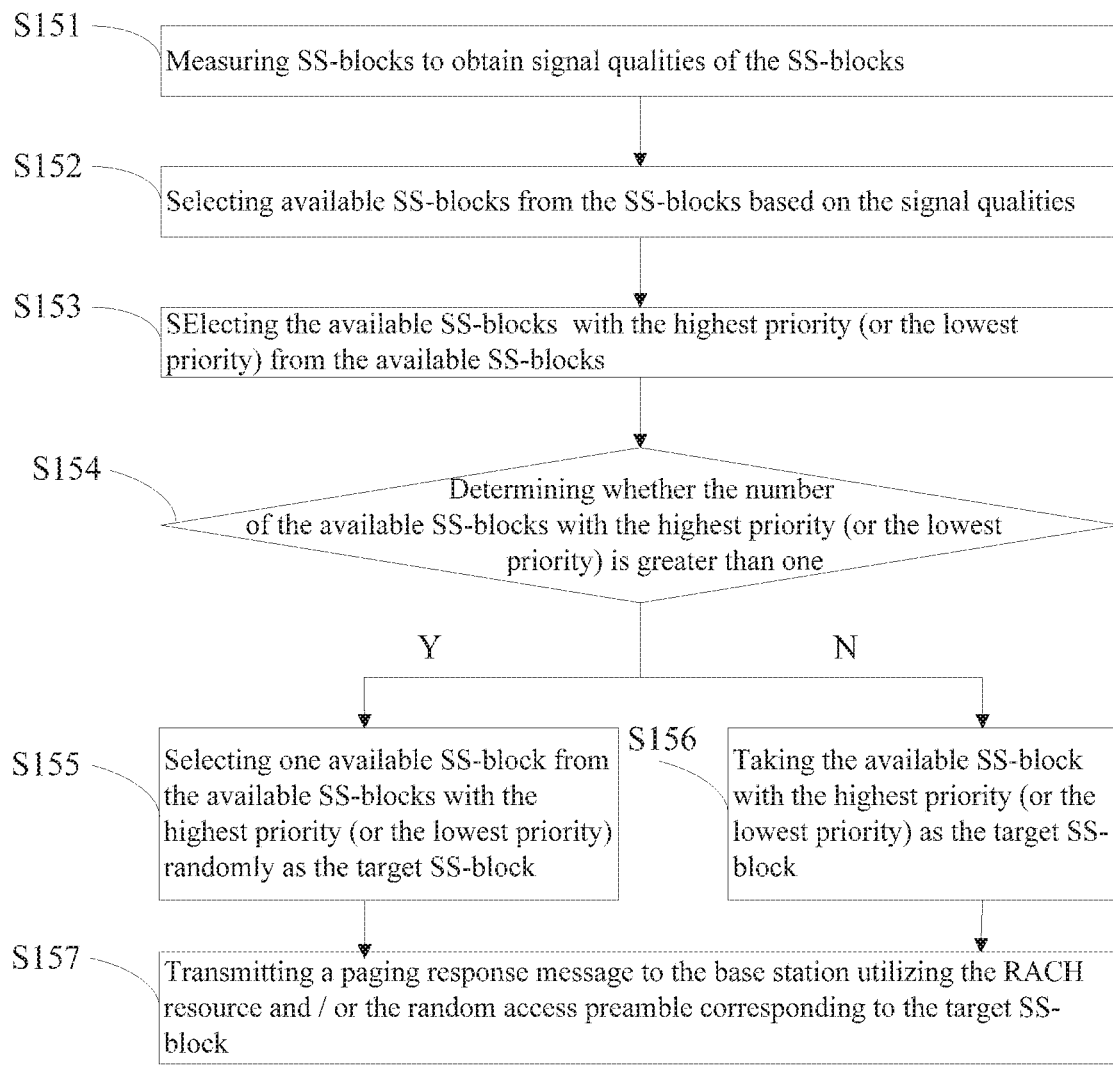
FIG. 6 is a flow chart of a sixth embodiment of a paging method of the present disclosure.

Referring to FIG. 6, a flow chart of a sixth embodiment of a paging method of the present disclosure is depicted. This embodiment is based on the first embodiment of the paging method of the present disclosure, where the specified parameter of each SS-block includes a priority, and the second predetermined condition includes a condition that the priority of a target SS-block is the highest or the lowest. This embodiment is an extension of the first embodiment of the paging method of the present disclosure, hence the same content as the first embodiment of the paging method of the present disclosure is not described again herein. The method may include the following blocks.

At S151: measuring SS-blocks to obtain signal qualities of the SS-blocks.

At S152: selecting suitable SS-blocks from the SS-blocks based on the signal qualities.

At S153: selecting the suitable SS-block(s) with the highest priority or the lowest priority from the suitable SS-blocks.

In this embodiment, the highest priority or the lowest priority does not refer to the priority of the SS-block(s) with the highest priority or the lowest priority among all the SS-blocks in the cell on which the UE currently camps, but refers to the priority of the SS-block(s) with the highest priority or the lowest priority among all of the suitable SS-blocks.

At S154: determining whether the number of the suitable SS-blocks with the highest priority or the lowest priority is greater than one.

If the number is greater than one, the process proceeds to S155; otherwise, the process proceeds to S156.

At S155: randomly selecting one suitable SS-block from the suitable SS-blocks with the highest priority or the lowest priority as the target SS-block.

The process proceeds to S157.

At S156: taking the suitable SS-block with the highest priority or the lowest priority as the target SS-block.

At S157: transmitting a paging response message to the base station utilizing the RACH resource and/or the random access preamble corresponding to the target SS-block.

Figure 7:
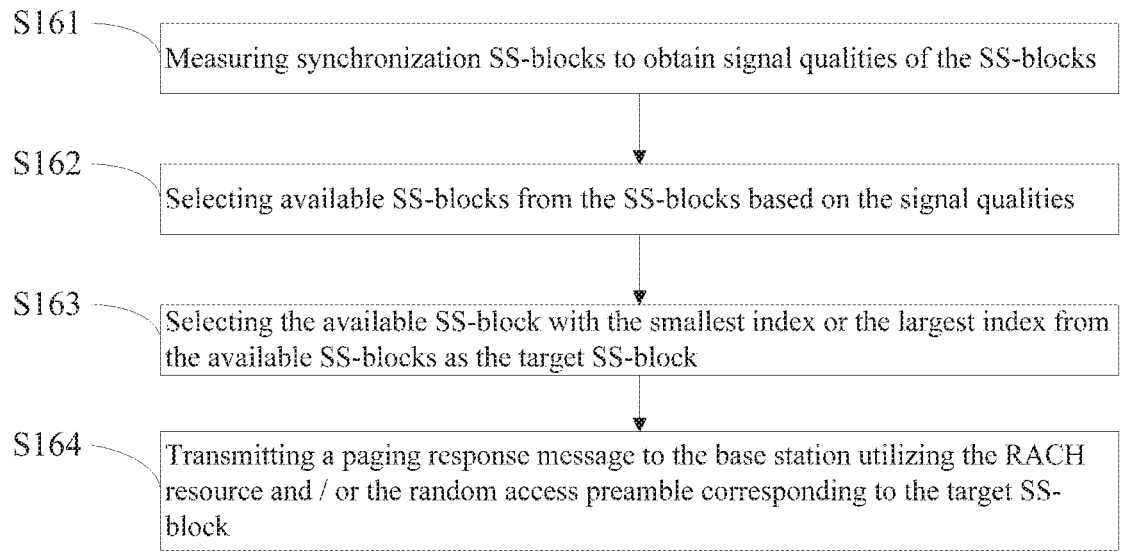
FIG. 7 is a flow chart of a seventh embodiment of a paging method of the present disclosure.

Referring to FIG. 7, a flow chart of a seventh embodiment of a paging method of the present disclosure is depicted. This embodiment is based on the first embodiment of the paging method of the present disclosure, where the specified parameter of each SS-block includes an index, and the second predetermined condition includes a condition that the index of a target SS-block is the smallest or the greatest. This embodiment is an extension of the first embodiment of the paging method of the present disclosure, hence the same content as the first embodiment of the paging method of the present disclosure is not described again herein. The method may include the following blocks.

At S161: measuring SS-blocks to obtain signal qualities of the SS-blocks.

At S162: selecting suitable SS-blocks from the SS-blocks based on the signal qualities.

At S163: selecting the suitable SS-block with the smallest index or the largest index from the suitable SS-blocks as the target SS-block.

At S164: transmitting a paging response message to the base station utilizing the RACH resource and/or the random access preamble corresponding to the target SS-block.

Figure 8:
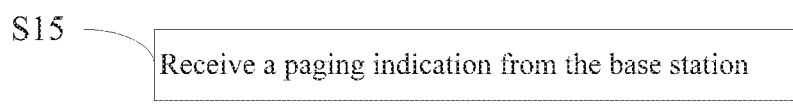
FIG. 8 is a flow chart of an eighth embodiment of a paging method of the present disclosure.

Referring to FIG. 8, a flow chart of an eighth embodiment of a paging method of the present disclosure is depicted. This embodiment is based on the first embodiment of the paging method of the present disclosure. The method may include the following blocks before S14.

At S15: receiving a paging indication from the base station.

The paging indication may be included in downlink control information or carried by a non-scheduled physical channel (e.g., PBCH) or physical downlink shared channel.

The paging indication may be a hash applied to an identifier of a paged UE, a truncation of the identifier of the paged UE, an identifier or a bitmap of a paging group where the paged UE locates. The bitmap is a binary number, and each bit of the bitmap corresponds to a paging group. The value of each bit of the bitmap indicates whether the corresponding paging group includes the paged UE. For example, if the value of a certain bit of the bitmap is 0, it indicates that there is no UE being paged in the paging group corresponding to the bit having the value of 0; if the value of a certain bit of the bitmap is 1, it indicates that at least one UE is paged in the paging group corresponding to the bit having the value of 1.

Figure 9:
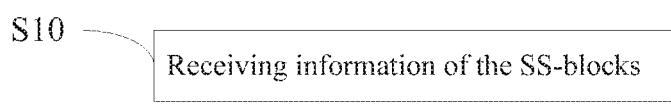
FIG. 9 is a flow chart of a ninth embodiment of a paging method of the present disclosure.

Referring to FIG. 9, a flow chart of a ninth embodiment of a paging method of the present disclosure is depicted. This embodiment is based on the first embodiment of the paging method of the present disclosure. The method may include the following blocks before S11.

At S10: receiving information of the SS-blocks.

The information of each SS-block includes the specified parameter, the corresponding downlink beam, the RACH resource, and/or the random access preamble.

If the specified parameter of each SS-block includes the priority, and the mapping relationship between the priority and the index of each SS-block is explicitly defined, the information of each SS-block may not include its own priority.

Figure 10:
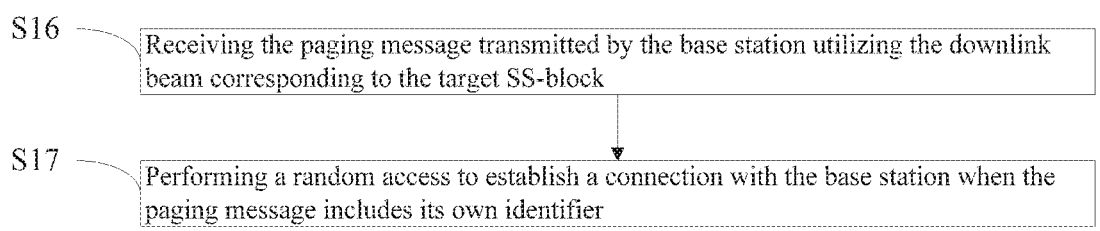
FIG. 10 is a flow chart of a tenth embodiment of a paging method of the present disclosure.

Referring to FIG. 10, a flow chart of a tenth embodiment of a paging method of the present disclosure is depicted. This embodiment is based on the first embodiment of the paging method of the present disclosure. The method may include the following blocks after S14.

At S16: receiving the paging message transmitted by the base station utilizing the downlink beam corresponding to the target SS-block.

At S17: performing a random access to establish a connection with the base station when the paging message includes its own identifier.

The following is a simulation result of an embodiment of the paging method of the present disclosure. In this embodiment, the SS-blocks are divided into two groups, the first group consists of even-indexed SS-blocks, the second group consists of odd-indexed SS-blocks, and the first group has a higher priority than the second group. The second predetermined condition includes a condition that the index of the target SS-block is the smallest while the priority of the target SS-block is the highest.

In the simulation, L SS-blocks are configured in the cell, and the L SS-blocks have indices ranging from 0 to L−1. Each SS-block respectively corresponds to at least one downlink beam, and the index of each downlink beam is the index of the corresponding SS-block.

The number of the UEs which responds to each PI is N, wherein N is related to the definition and the configuration of the PI. For instance, in an extreme case, the PI is set to be a P-RNTI scrambled DCI, and all the UEs camps on the cell should respond to the PI; in another extreme case, the PI is set to be an exact ID of the paged UE, and only one UE with the same ID may respond to the PI.

Two cases in which the cell is configured with L=8 or L=64 SS-blocks are respectively considered. For the case L=8, N ranges from 1 to 50, and each UE is respectively randomly assigned with 2 or 3 suitable SS-blocks which have indices ranges from 0 to 7. For the case L=64, N ranges from 1 to 200, and each UE is respectively randomly assigned with 2, 3 or 4 suitable SS-blocks which have indices ranges from 0 to 63. In both cases, it is assumed that the signal qualities of the suitable SS-blocks are progressively decreased.

Figure 11:
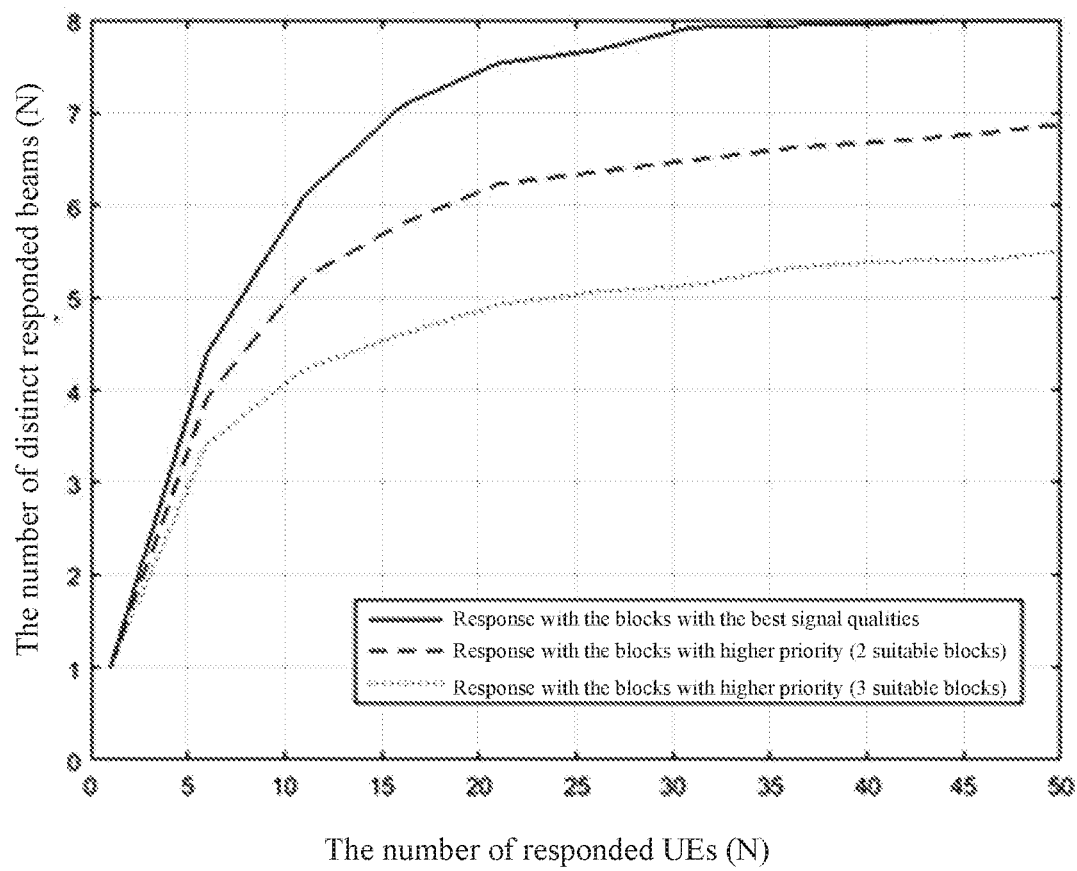
FIG. 11 is a schematic diagram of a simulation result of the number of distinct responded beams of different beam selection schemes with L=8 according to an embodiment of the present disclosure.
Figure 12:
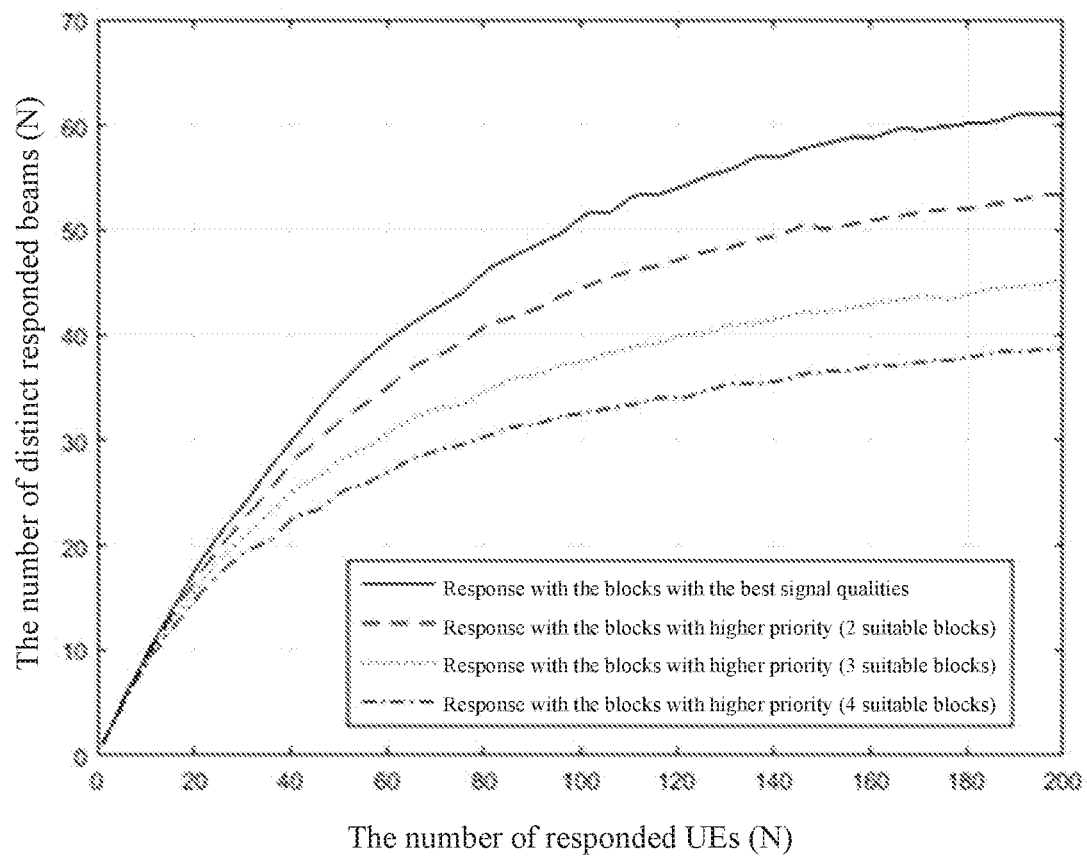
FIG. 12 is a schematic diagram of a simulation result of the number of distinct responded beams of different beam selection schemes with L=64 according to an embodiment of the present disclosure.

The simulation result of the number of distinct responded beams of different beam selection schemes with L=8 is shown in FIG. 11, and the simulation result of the number of distinct responded beams of different beam selection schemes with L=64 is shown in FIG. 12. In FIG. 11 and FIG. 12, the number (N) of the responded UEs for a PI is used as X-axis, and the number of distinct responded beams (the downlink beams selected by the UE for transmitting paging messages) by UEs is used as Y-axis. The scheme in the related art is taken as the baseline scheme, in which the UE selects the SS-block with the best signal quality as the target SS-block.

As shown in FIG. 11, for the case L=8, in comparison with the baseline scheme, when each UE has 2 suitable SS-blocks, more than one distinct responded beam can be reduced on average; when each UE has 3 suitable SS-blocks, more than two distinct responded beams can be reduced on average. As shown in FIG. 12, for the case L=64, in comparison with the baseline scheme, when each UE has 2 suitable SS-blocks, about 8 distinct responded beams can be reduced; when each UE has 3 suitable SS-blocks, about 16 distinct responded beams can be reduced; when each UE has 4 suitable SS-blocks, about 22 distinct responded beams can be reduced.

It should be noted that, in this simulation, the suitable SS-blocks are randomly assigned to each UE without any correlation among them, thus the performance obtained by the simulation indicates the lower bound. In practical applications, correlations may exist among the suitable signal blocks of the UE, and better performance of the method provided in this embodiment can be expected.

Figure 13:
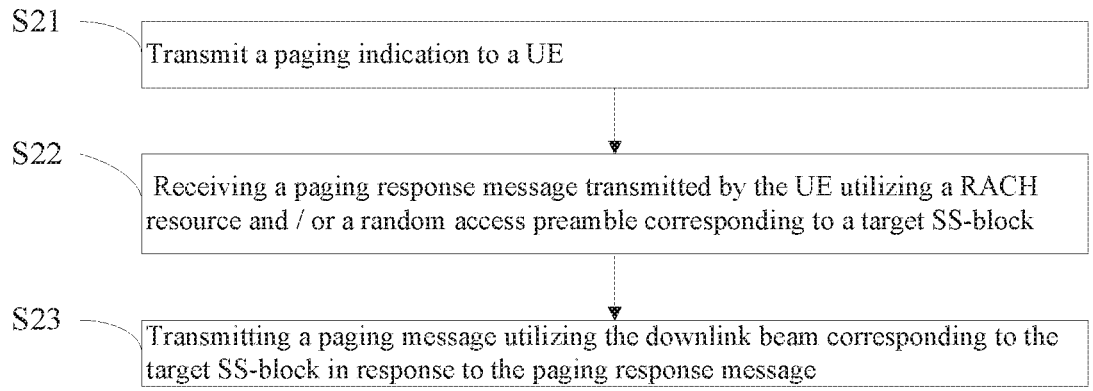
FIG. 13 is a flow chart of an eleventh embodiment of a paging method of the present disclosure.

Referring to FIG. 13, a flow chart of an eleventh embodiment of a paging method of the present disclosure is depicted. An execution main body of the eleventh embodiment is a base station. The base station is connected to a core network and performs wireless communication with a UE, and provides communication coverage for a corresponding geographical area. The base station may be a macro base station, a micro base station, a pico base station, or a femtocell. In some embodiments, the base station may also be referred as a radio base station, an access point, a Node B, an evolved Node B (eNodeB, eNB), a gNB, or other suitable terms. As shown in FIG. 13, the method may include the following blocks.

At S21: transmitting a paging indication to a UE.

The paging indication may be included in downlink control information or carried by a non-scheduled physical channel (e.g., PBCH) or physical downlink shared channel.

The paging indication may be a hash applied to an identifier of a paged UE, a truncation of the identifier of the paged UE, an identifier or a bitmap of a paging group where the paged UE locates. The bitmap is a binary number, and each bit of the bitmap corresponds to a paging group. The value of each bit of the bitmap indicates whether the corresponding paging group includes the paged UE. For example, if the value of a certain bit of the bitmap is 0, it indicates that there is no UE being paged in the paging group corresponding to the bit having the value of 0; if the value of a certain bit of the bitmap is 1, it indicates that there are UE(s) being paged in the paging group corresponding to the bit having the value of 1.

At S22: receiving a paging response message transmitted by the UE utilizing a RACH resource and/or a random access preamble corresponding to a target SS-block.

The target SS-block is selected by the UE from suitable SS-blocks, the suitable SS-blocks are selected by the UE from SS-blocks based on signal qualities of the SS-blocks, and the signal qualities of the SS-blocks are obtained by the UE through measuring the SS-blocks.

Each SS-block includes PSS, SSS and PBCH. Each SS-block respectively corresponds to a downlink beam as well as a RACH resource and/or a random access preamble. Each SS-block may be transmitted on its corresponding downlink beam(s) and associated with its corresponding RACH resource and/or random access preamble. Different SS-blocks correspond to different RACH resources and/or random access preambles, and the downlink beams corresponding to different SS-blocks may be in the same direction or in different directions.

The signal qualities of the suitable SS-blocks may satisfy a first predetermined condition, and a specified parameter of the target SS-block may satisfy a second predetermined condition. The signal qualities of the SS-blocks may be related to the UE, that is, for the same SS-block, its signal quality measured by different UEs may be different. The specified parameter of each SS-block and the second predetermined condition may be irrelevant to the UE. That is, for different UEs, the second predetermined condition and the specified parameter of each SS-block received by different UEs are the same.

At S23: transmitting a paging message utilizing the downlink beam corresponding to the target SS-block in response to the paging response message.

The base station may confirm the target SS-block selected by the UE according to the RACH resource and/or the preamble carrying the paging response message, and further confirm the downlink beam corresponding to the target SS-block.

For more detailed descriptions and feasible extensions, reference may be made to the corresponding contents of the above-mentioned embodiments.

Through the implementation of this embodiment, the UE firstly selects the suitable SS-blocks from the SS-blocks based on the signal qualities, and then selects the target SS-block from the suitable SS-blocks based on the specified parameters irrelevant to the UE. Since the specified parameters irrelevant to the UE are utilized during the selection, for the UEs which are in the same paging group and located in similar wireless environment (at least parts of the suitable SS-blocks are the same while the SS-blocks with the best signal quality are different), it is possible to select the same target SS-block in the present disclosure while different target SS-blocks in the related art, thereby reducing the number of the downlink beams for transmitting the paging message, without being affected by the grouping mode of the paging groups.

Figure 14:
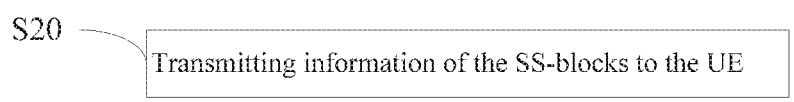
FIG. 14 is a flow chart of a twelfth embodiment of a paging method of the present disclosure.

Referring to FIG. 14, a flow chart of a twelfth embodiment of a paging method of the present disclosure is depicted. This embodiment is based on the eleventh embodiment of the paging method of the present disclosure. The method may include the following blocks before S22.

At S20: transmitting information of the SS-blocks to the UE.

The information of each SS-block may include the specified parameter, the corresponding downlink beam, the RACH resource, and/or the random access preamble.

The specified parameter of each SS-block may include a priority. The SS-blocks may be divided into at least two groups. Wherein the SS-blocks in the same group are assigned with a same priority, and the SS-blocks in different groups are assigned with different priorities.

If the specified parameter of each SS-block includes the priority, and the mapping relationship between the priority and the index of each SS-block is explicitly defined, the information of each SS-block may not include its own priority.

Figure 15:
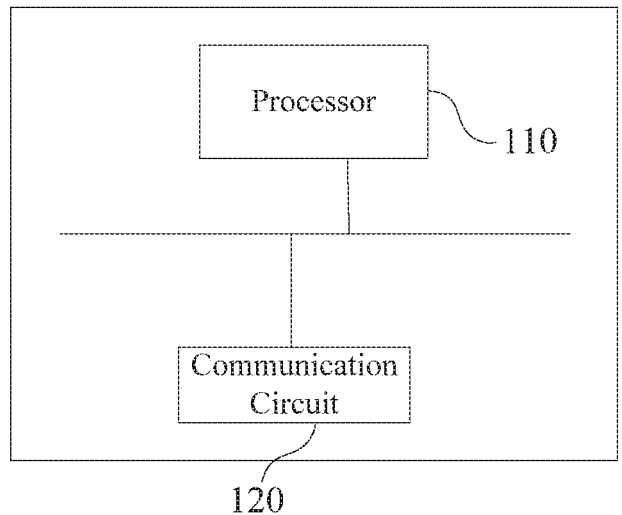
FIG. 15 is a schematic diagram of the structure of a first embodiment of a paging device of the present disclosure.

Referring to FIG. 15, a schematic diagram of the structure of a first embodiment of a paging device of the present disclosure is depicted. The first embodiment of the paging device of the present disclosure may include a processor 110 and a communication circuit 120, wherein the processor 110 is connected to the communication circuit 120.

The communication circuit 120 is configured to transmit and receive user data, and is an interface for the paging device to communicate with other communication devices.

The processor 110 is configured to control the operation of the paging device. The processor 110 may also be referred to as a CPU (central processing unit). The processor 110 may be an integrated circuit chip having signal processing capability. The processor 110 may also be a general purpose processor, a digital signal processor (DSP), an application specific integrated circuit (ASIC), a field-programmable gate array (FPGA). The processor 110 may also be other programmable logic device, a discrete gate logic device, a transistor logic device, or a discrete hardware component. The general purpose processor may be a microprocessor, or the processor may also be any conventional processor.

The processor 110 is configured to execute instructions to implement the methods provided in any of the first to the tenth embodiments of the present disclosure and any of their non-conflicting combination.

In this embodiment, the paging device may be a UE, or a separate component integrated into the UE, such as a baseband chip.

Figure 16:
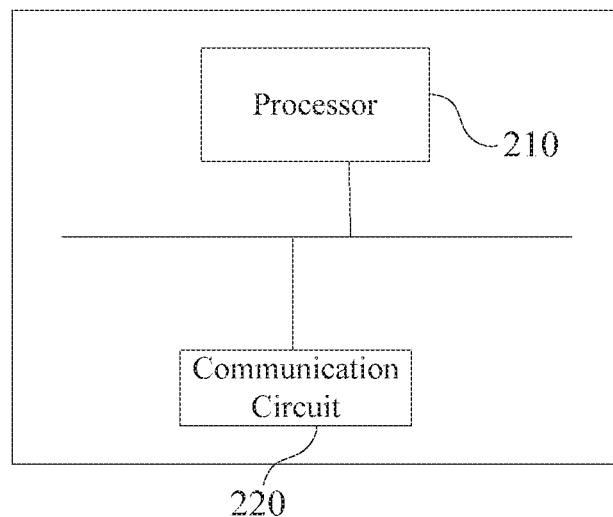
FIG. 16 is a schematic diagram of the structure of a second embodiment of a paging device of the present disclosure.

Referring to FIG. 16, a schematic diagram of the structure of a second embodiment of a paging device of the present disclosure is depicted. The second embodiment of the paging device of the present disclosure includes a processor 210 and a communication circuit 220, wherein the processor 210 is connected to the communication circuit 220.

The communication circuit 220 is configured to transmit and receive user data, and is an interface for the paging device to communicate with other communication devices.

The processor 210 is configured to control the operation of the paging device. The processor 210 may also be referred to as a CPU (central processing unit). The processor 210 may be an integrated circuit chip having signal processing capability. The processor 210 may also be a general purpose processor, a digital signal processor (DSP), an application specific integrated circuit (ASIC), a field-programmable gate array (FPGA). The processor 210 may also be another programmable logic device, a discrete gate logic device, a transistor logic device, or a discrete hardware component. The general purpose processor may be a microprocessor, or the processor may also be any conventional processor.

The processor 210 is configured to execute instructions to implement the methods provided in the eleventh or the twelfth embodiments of the paging method of the present disclosure.

In this embodiment, the paging device may be a base station, or a separate component integrated into the base station, such as a baseband board.

Figure 17:
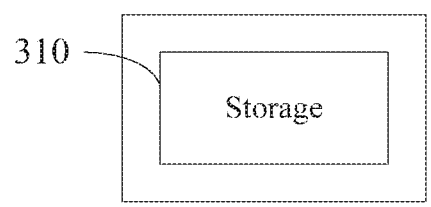
FIG. 17 is a schematic diagram of the structure of a first embodiment of a readable storage medium of the present disclosure.

Referring to FIG. 17, a schematic diagram of the structure of a first embodiment of a readable storage medium of the present disclosure is depicted. The first embodiment of the readable storage medium of the present disclosure includes a storage 310 in which instructions are stored, and the methods provided in any of the first to the tenth embodiments of the paging method of the present disclosure and any of their non-conflicting combination are implemented when the instructions are executed.

The storage 310 may include a read-only memory (ROM), a random access memory (RAM), a flash memory, a hard disk, an optical disk, etc.

In this embodiment, the readable storage medium may be a standalone component, or be integrated into a UE, or be a component in a UE, such as a baseband chip.

Figure 18:
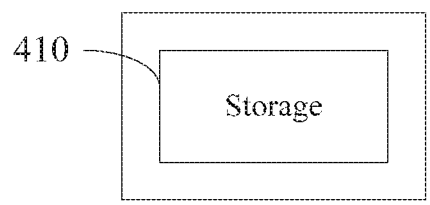
FIG. 18 is a schematic diagram of the structure of a second embodiment of a readable storage medium of the present disclosure.

Referring to FIG. 18, a schematic diagram of the structure of a second embodiment of a readable storage medium of the present disclosure is depicted. The second embodiment of the readable storage medium of the present disclosure includes a storage 410 in which instructions are stored, and the methods provided in the eleventh or the twelfth embodiments of the paging method of the present disclosure is implemented when the instructions are executed.

The storage 410 may include a read-only memory (ROM), a random access memory (RAM), a flash memory, a hard disk, an optical disk, etc.

In this embodiment, the readable storage medium may be a standalone component, or be integrated into a base station, or be a component in a base station, such as a baseband board.

In the embodiments provided by the present disclosure, it is to be understood that the disclosed methods and devices can be implemented in other ways. For example, the device embodiments described above are merely illustrative; the division of the modules or units is merely a division of logical functions, and can be divided in other ways such as combining or integrating multiple units or components with another system when being implemented; and some features can be ignored or not executed. In another aspect, the coupling such as direct coupling and communication connection which is shown or discussed can be implemented through some interfaces, and the indirect coupling and the communication connection between devices or units can be electrical, mechanical, or in any other suitable means.

The units described as separated components can or cannot be physically separate, and the components shown as units can or cannot be physical units, that is, the components shown as units can be located in one place or distributed over a plurality of network elements. It is possible to select some or all of the units in accordance with the actual needs to achieve the object of the embodiments.

In addition, each of the functional units in each of the embodiments of the present disclosure can be integrated in one processing unit. Each unit can be physically exists alone, or two or more units can be integrated in one unit. The above-mentioned integrated unit can be implemented either in the form of hardware, or in the form of software functional units.

The integrated unit can be stored in a computer-readable storage medium if it is implemented in the form of a software functional unit and sold or utilized as a separate product. Based on this understanding, the technical solution of the present disclosure, either essentially or in part, contributes to the related art, or all or a part of the technical solution can be embodied in the form of a software product. The software product is stored in a storage medium, which includes a number of instructions for enabling a computer device (which can be a personal computer, a server, a network device, etc.) or a processor to execute all or a part of the blocks of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A paging method, comprising:
measuring, by a user equipment, synchronization signal blocks to obtain signal qualities of the synchronization signal blocks, wherein each synchronization signal block respectively corresponds to at least one of downlink beams, a random access channel resource, or a random access preamble;
selecting, by the user equipment, suitable synchronization signal blocks from the synchronization signal blocks based on the signal qualities, wherein the signal qualities of the suitable synchronization signal blocks satisfies a first predetermined condition;
transmitting a random access channel (RACH) resource and/or the random access preamble corresponding to a target synchronization signal block, wherein the target synchronization signal block is selected from the suitable synchronization signal blocks depending on a specified parameter of the target synchronization signal block satisfying a second predetermined condition; and
transmitting a paging response message to a base station utilizing the random access channel (RACH) resource or the random access preamble corresponding to the suitable synchronization signal blocks, wherein the paging response message is configured to instruct the base station to transmit the paging message utilizing the downlink beam corresponding to the target synchronization signal block.

2. The method of claim 1, wherein the first predetermined condition includes a condition that the signal quality of each suitable synchronization signal block is greater than a predetermined threshold.

3. The method of claim 2, wherein the first predetermined condition is locally stored in the user equipment, or is transmitted from a base station.

4. The method of claim 1 wherein each of the synchronization signal blocks comprises a primary synchronization signal (PSS), a secondary synchronization signal (SSS), and a physical broadcast channel (PBCH), and each of the synchronization signal blocks corresponds to at least one downlink beam as well as the RACH resource and/or the random access preamble.

5. The method of claim 4, wherein each of the synchronization signal blocks is transmitted on its corresponding downlink beam and associated with its corresponding RACH resource and/or preamble.

6. The method of claim 4, wherein different synchronization signal blocks correspond to different RACH resources and/or random access preambles, and the downlink beams corresponding to different synchronization signal blocks in the same direction or in different directions.

7. The method of claim 1, wherein the user equipment is in RRC_IDLE or RRC_INACTIVE state.

8. The method of claim 1, wherein each synchronization signal block comprises a specified parameter, and the specified parameter of each synchronization signal block is defined by a core network or a base station for each suitable synchronization signal block.

9. The method of claim 8, wherein the specified parameter comprises at least one of a priority and/or an index of the synchronization signal block.

10. The method of claim 9, wherein the index of each synchronization signal block is utilized to distinguish different synchronization signal blocks from each other.

11. The method of claim 1, wherein the measuring step, the selecting step and the transmitting step are periodically performed.

12. The method of claim 1, wherein the specified parameter comprises at least one of a priority and an index of the synchronization signal block, and the second predetermined condition comprises a condition that one suitable synchronization signal block with the smallest index from the suitable synchronization signal blocks with the highest priority is selected as the target synchronization signal block.

13. The method of claim 1, wherein the specified parameter comprises at least one of a priority and an index of the synchronization signal block, and the second predetermined condition comprises a condition that one suitable synchronization signal block with the greatest index from suitable synchronization signal blocks with the highest priority is selected as the target synchronization signal block.

14. The method of claim 1, wherein the specified parameter comprises at least one of a priority and an index of the synchronization signal block, and the second predetermined condition comprises a condition that one suitable synchronization signal block with the smallest index from suitable synchronization signal blocks with the lowest priority is selected as the target synchronization signal block.

15. The method of claim 1, wherein the specified parameter comprises at least one of a priority and an index of the synchronization signal block, and the second predetermined condition comprises a condition that one suitable synchronization signal block with the greatest index from suitable synchronization signal blocks with the lowest priority is selected as the target synchronization signal block.

16. The method of claim 1, wherein the specified parameter comprises at least one of a priority and an index of the synchronization signal block, and the second predetermined condition comprises a condition that one suitable synchronization signal block with the smallest index or the greatest index is selected as the target synchronization signal block.

17. The method of claim 1, wherein the signal qualities of the synchronization signal blocks measured by different user equipments are different.

18. A paging device, comprising a processor and a communication circuit, wherein the processor is connected to the communication circuit; and
the processor is configured to execute instructions to implement operations comprising:
measuring synchronization signal blocks to obtain signal qualities of the synchronization signal blocks, wherein each synchronization signal block respectively corresponds to at least one of downlink beams, a random access channel resource, or a random access preamble;
selecting suitable synchronization signal blocks from the synchronization signal blocks based on the signal qualities, wherein the signal qualities of the suitable synchronization signal blocks satisfies a first predetermined condition;
transmitting a random access channel (RACH) resource and/or the random access preamble corresponding to a target synchronization signal block, wherein the target synchronization signal block is selected from the suitable synchronization signal blocks depending on a specified parameter of the target synchronization signal block satisfying a second predetermined condition; and
transmitting a paging response message to a base station utilizing the random access channel (RACH) resource or the random access preamble corresponding to the suitable synchronization signal blocks, wherein the paging response message is configured to instruct the base station to transmit the paging message utilizing the downlink beam corresponding to the target synchronization signal block.

19. A non-transitory readable storage medium, having instructions stored therein, wherein the instructions are executable by a processor to perform operations comprising:
measuring synchronization signal blocks to obtain signal qualities of the synchronization signal blocks, wherein each synchronization signal block respectively corresponds to at least one of downlink beams, a random access channel resource, or a random access preamble;
selecting suitable synchronization signal blocks from the synchronization signal blocks based on the signal qualities, wherein the signal qualities of the suitable synchronization signal blocks satisfies a first predetermined condition;
transmitting a random access channel (RACH) resource and/or the random access preamble corresponding to a target synchronization signal block, wherein the target synchronization signal block is selected from the suitable synchronization signal blocks depending on a specified parameter of the target synchronization signal block satisfying a second predetermined condition; and
transmitting a paging response message to a base station utilizing the random access channel (RACH) resource or the random access preamble corresponding to the suitable synchronization signal blocks, wherein the paging response message is configured to instruct the base station to transmit the paging message utilizing the downlink beam corresponding to the target synchronization signal block.

* * * * *